United States Patent [19]
Lewis et al.

[11] Patent Number: 6,041,869
[45] Date of Patent: Mar. 28, 2000

[54] TURF AERATOR WITH CONSTANTLY VERTICAL TINES

[75] Inventors: D. Michael Lewis; Craig M. Schmeiser; Stanton L. Sweet, all of Cedar Falls, Iowa

[73] Assignee: Textron Inc., Providence, R.I.

[21] Appl. No.: 09/027,914

[22] Filed: Feb. 23, 1998

[51] Int. Cl.⁷ ................................... A01B 45/02
[52] U.S. Cl. .............................. 172/21; 172/93; 172/95; 172/101
[58] Field of Search ................. 172/20–22, 93, 172/95, 101

[56] References Cited

U.S. PATENT DOCUMENTS

| | | |
|---|---|---|
| 585,484 | 6/1897 | Shafer .................................. 172/101 X |
| 2,347,748 | 5/1944 | Melling . |
| 3,136,274 | 6/1964 | Townsend .............................. 172/21 X |
| 3,856,090 | 12/1974 | Haffner et al. ............................ 172/20 |
| 4,154,305 | 5/1979 | Prewett ...................................... 172/21 |
| 4,569,400 | 2/1986 | Minagawa et al. ....................... 172/21 |
| 4,614,239 | 9/1986 | Minagawa et al. ....................... 172/21 |
| 4,662,456 | 5/1987 | Classen .................................... 172/22 |
| 4,753,298 | 6/1988 | Hansen et al. ............................ 172/22 |
| 5,207,278 | 5/1993 | Hatlen ...................................... 172/22 |
| 5,398,767 | 3/1995 | Warke ...................................... 172/21 |
| 5,810,092 | 9/1998 | Selvatici ................................. 172/21 X |

*Primary Examiner*—Christopher J. Novosad
*Attorney, Agent, or Firm*—Arthur J. Hansmann

[57] ABSTRACT

Turf aerator having a crank and crank arms which present a parallelogram for supporting the aerator assembly, including the aerating tines.

23 Claims, 3 Drawing Sheets

TURF AERATOR WITH CONSTANTLY VERTICAL TINES

This invention relates to a turf aerator, and, more particularly it relates to a turf aerator which is arranged to maneuver the aerating tines in a vertical orientation so that the holes formed in the turf are of a vertical arrangement.

BACKGROUND OF THE INVENTION

Turf aerators are well known in the art, and they are of the type which includes a mobile unit movable over the ground and which articularly supports and powers an assembly of a crank mechanism and turf penetrating tines. The arrangements are such that the cranks are powered to cyclically move the tines in both the vertical and horizontal directions so that the tines will penetrate the ground while the unit is moving forward, and the tines will then also remain in the ground and finally be extracted from the ground, again while the unit is still moving forward.

The concern in turf aerating is to form the aerating holes in a constricted but vertical pattern so that the holes are only of the cross section dimension desired, that is, the holes are not formed with a tine which tilts or moves horizontally while the tines are in the ground. The present invention accomplishes this by having a parallelogram arrangement whereby the tines remain vertically oriented throughout their crank-type movement.

Still further, the aforementioned is accomplished and the aerator is arranged to have the cranks and tines in two side-by-side sets so that they can alternately penetrate the ground and perform the desired walking action during the forward movement of the entire machine. In that arrangement, each set includes the crank and the crank arms and the tine assembly, and there two complete sets, in side-by-side arrangement, both of which are actuated off a common shaft and both of which have two crank arms disposed in the fore-and-aft plane of the turf aerating direction of movement of the machine.

In accomplishing the aforementioned, the-aerator is arranged to be stable in the direction of the fore-and-aft aerating movement and in the direction lateral thereto.

Also, the apparatus is arranged to selectively position the tines in an elevated service position.

DETAILED DESCRIPTION OF THE PREFERRED EMBODIMENT

Figure 1:
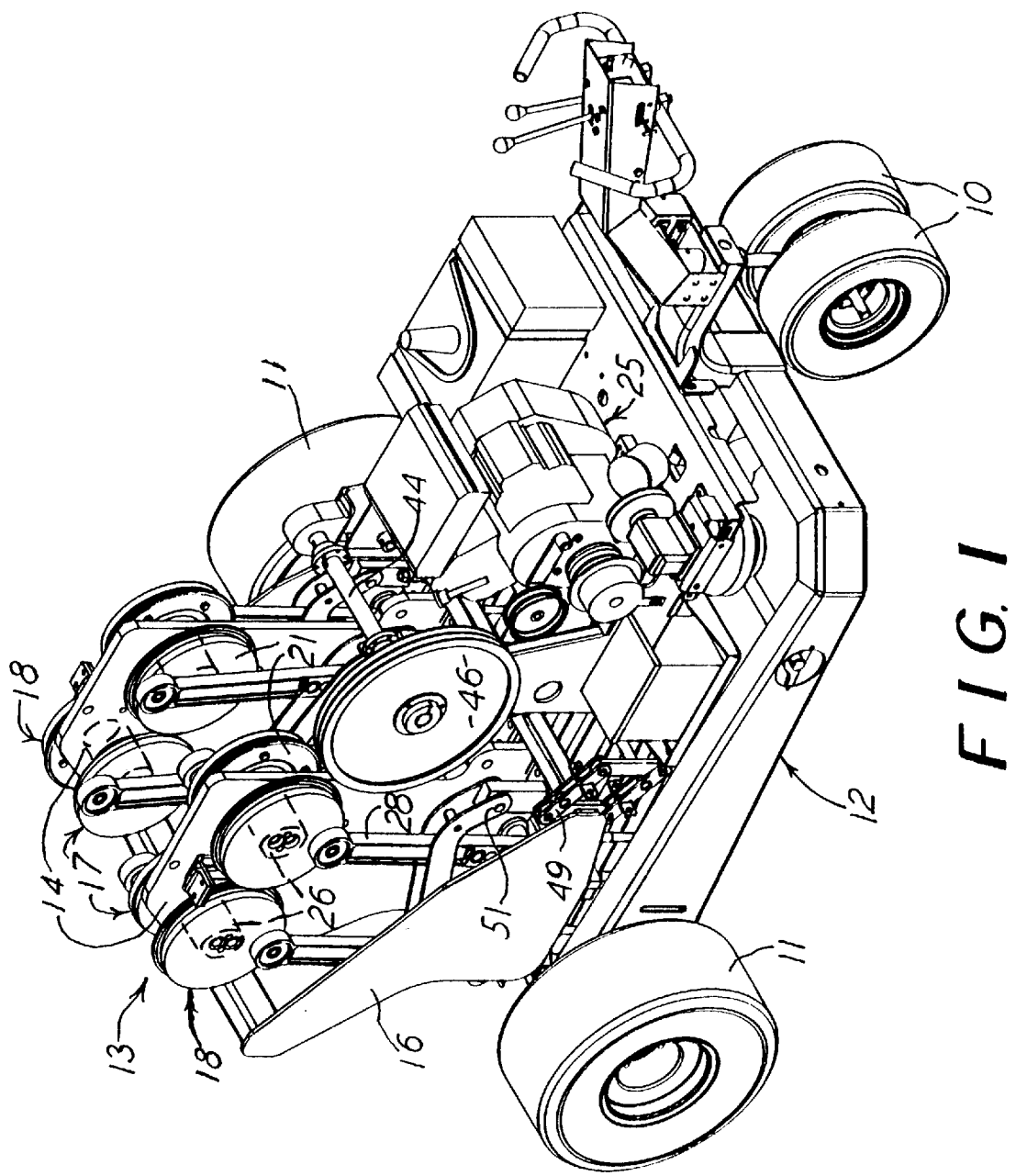
FIG. 1 is a front perspective view of a turf aerator of this invention.

FIG. 1 shows a ground-mobile machine which presents the turf aerator of this invention, and the machine includes front wheels 10 and two rear wheels 11. Of course the machine can be self-powered or towed by a tractor. The machine also includes a frame, generally designated 12, which supports the operating aerating apparatus, generally designated 13. That overall arrangement is well understood by one skilled in the art, and U.S. Pat. No. 2,347,748 also displays a general type of mobile-aerating apparatus.

The basic frame or chassis 12 supports two upstanding mounting plates 14, in any conventional manner, and there is also a side plate 16 on the frame 12. Thus each upstanding plate 14 is spaced from the other and suitably rotatably supports two sets of crank mechanisms 17 and 18.

Figure 2:
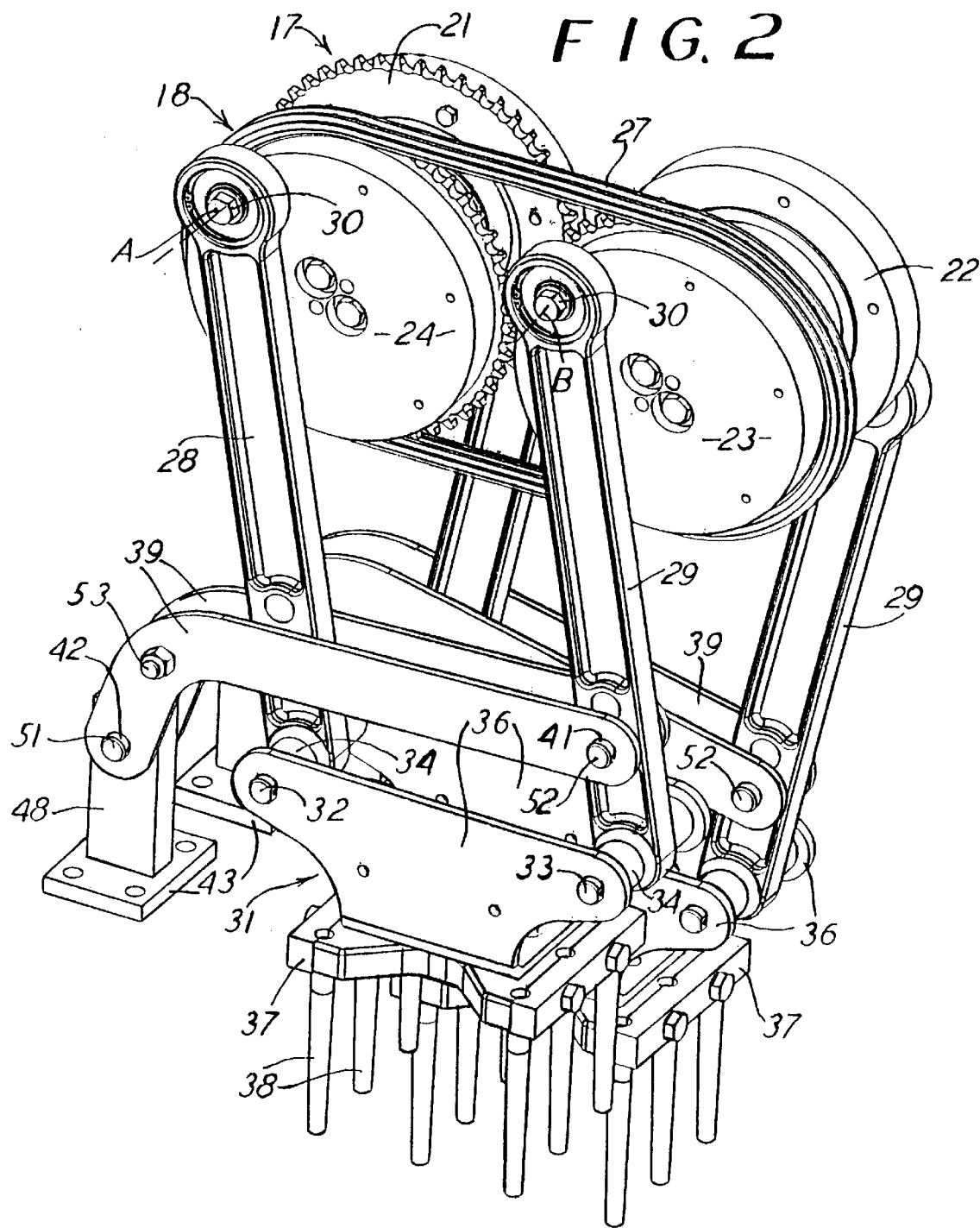
FIG. 2 is an enlarged rear perspective view of the aerating mechanism shown in FIG. 1.

It will be seen that the two sets 17 and 18 each include two rotatably mounted crank discs 21, 22, 23, and 24, as indicated in FIG. 2, and the side-by-side ones of those four discs are rotatably mounted on a common shaft 26 of which there are two on each plate 14. Thus, the crank discs 21 and 22, and likewise also the discs 23 and 24, are disposed in the respective vertical plane which is extending the fore-and-aft direction of movement of the machine, and the discs 21 and 24, and likewise discs 22 and 23, are respectively in side-by-side relationship. Still further, the sets 17 and 18 are themselves also in duplicate, that is, there are the two sets 17 and 18 in side-by-side relationship on the spaced-apart plates 14.

The machine itself is shown to have a power unit generally designated 25, and, with a suitable power drive connection, the power plant 25 is in driving relationship to the sets 17 and 18, that arrangement may be such that the disc 21 is a sprocket and is directly driven by the power plant 25, such as by the chain drive from the plant 25 to the sprocket 21, in any conventional manner. With that arrangement, and through the common supporting shaft 26, the disc 24 is driven in unison with the drive to the disc 21. In turn, the disc 23 is driven off the disc 24, in that the discs 23 and 24 are sprockets and have a drive chain 27 extending therebetween. Finally, with the common shaft 26 supporting the discs 22 and 23, the disc 22 is also driven in unison with the rotation of the other three discs which therefore have the four discs all rotating in synchronization.

Each crank disc has an offset crank axis, such as the axis A and B shown with the discs 24 and 23. A crank arm 28 and a crank arm 29 are respectively suitably articularly connected to the respective discs 24 and 23 at the axes A and B, such as by connecting bolts 30. It will of course be seen that the throw or crank offset of the axes A and B are the same and are in the same angular direction regarding the longitudinal or central axis of each of the mounting shafts 26.

The lower ends of the arms 28 and 29 are also articularly connected to the tine assembly designated 31, and the connection is through the connecting pins 32 and 33 which also present longitudinal axes therethrough and of course which are parallel to the axes A and B, respectively. Thus, a cross sleeve 34 connects with the lower end of each arm 28 and 29 and is restrained by the respective pin or connector 32 and 33, all such that the arms 28 and 29 can pivot or articulate both relative to the crank discs 24 and 23 as well as to the tine assembly 31.

The assembly 31 includes two spaced-apart side plates 36 which are the part which actually receive the arm mounting pins 32 and 33, as shown. A tine mounting block 37 is affixed to the upright plates 36, and the vertically extending tines 38 are suitably attached to the block 37 and extend therebelow for the usual function of penetrating the turf in the aerating process.

The significance of the articular connection just described is that the arms 28 and 29 remain parallel to each other at all times and, along with the axes A and B and the axes of the pins 32 and 33, there is the formation of a parallelogram in the side elevational view, somewhat as seen in FIG. 2. That is, the axes A and B remain at a fixed spaced-apart distance and are always at the same synchronized angulation relative to each other, and of course the longitudinal axes of the pins 32 and 33 remain at a fixed spaced-apart distance as well as the distances along the arms 28 and 29.

With that parallelogram arrangement, the tine assembly 31 remains in a strict vertical orientation throughout its actuation, and thus the tines 38 will always be vertical relative to the ground even though the machine is moving forward in the aerating direction. Of course that is also saying that the assembly 31, and its tine mounting block 37, which is shown to be horizontal in FIG. 2, always remains in the horizontal plane or orientation throughout the actuation or rotation of the crank discs and the up-and-down movement of the crank arms 29 and 29.

To control and limit the arms 28 and 29 in the fore-and-aft upright vertical plane relative to the aerating direction, there is a linkage designated 39 which has a pin 41 connected to the arm 29 and which also has a pin 42 affixed relative to the frame 12, such as by means of the upright standard 43 which is affixedly mounted relative to the frame 12. With that arrangement, the linkage 39 will pivot up and down about its axis which is the longitudinal axis of its mounting pin 42, and that arcuate movement of the pin 41 will simply permit the crank arm 29 to move back-and-forth in the upright vertical plane of the aerating direction, but of course it will restrict that movement so that the desired control is achieved relative to the positioning of the tine assembly 31.

Of course FIG. 2 shows the two sets 17 and 18 in their side-by-side position, but without being obscured by the mounting or support plate 14 which has been removed for clarity of showing in FIG. 2. Also, the relationship or synchronization between the sets 17 and 18 is 180 degrees out of phase, as shown in these drawings, and thus when the set 17 is penetrating the turf, then the set 18 has been raised to its elevated position, such as shown in FIG. 2. Throughout this action, the desired walking action of the tines over and into the turf is achieved.

Of course the parallelogram geometry is achieved by having the crank arms 28 and 29 similarly connected and of the same length, and also the spacing between the longitudinal axes of the pins 32 and 33 is the same as the spacing between axes A and B. Further, with the tine plate 37, for instance, being horizontally disposed in its original assembly in the machine, then, by virtue of the parallelogram relationship, the plate 37 will always be horizontal and thus the tines 38 which are depending below the plate 37 at right angles thereto, will always be vertical.

Again, the power drive from the power plant 25 to the crank discs described can be from the power plant 25 and into the driven sprocket 46 on the shaft 44 and then, by a standard sprocket chain which is not shown, the drive can go to the driven sprocket 21 and on into the other three crank discs, as described.

The entire arrangement is such that the tines 38 are always vertical, that is, the block 37 is always horizontally disposed or at least disposed parallel to the frame 12 or parallel to whatever the ground line be, whether that be truly horizontal or angled. Of course that means that the shafts 26 are horizontal, and the cranks, such as shown by the attaching screws 30 which are on the axes A and B are also horizontal.

As mentioned, the two spaced-apart pivot arms 39 restrict the crank arms 28 and 29, and thus restrict the entire mechanism, in the fore-and-aft direction of movement. Further, the arms 39 are in snug contact and relationship with the sides of the crank arms 28 and 29, as well as the sides of the support standard 48, and the pins 41 and 42 retain that integrity or rigidity between the arms 39 and the crank arms 28 and 29 so that the crank arms cannot move laterally of the fore-and-aft direction mentioned. As such, the tine assembly 31 is restrained in movement so that it can be properly positioned and controlled for the penetration of the ground, Also, the upright plates 36 of the assembly 31 can be of one U-shaped piece, as indicated in FIG. 2, and, it is a single rigid piece which has the sleeves 34 received between the upstanding plates 36 and the ends of the sleeves 34 can be in contact with the plates 36 to render further lateral stability to the connection between the crank arms 28 and 29, and the assembly 31. Of course the pins 32 and 33 are thus snug within the sleeves 34, all for the lateral integrity and lack of lateral movement between the connected parts as they are shown.

Also, the arrangement seen in FIG. 1 is such that the entire aerating mechanism designated 13 is mounted for up-and-down movement relative to the chassis 12, and such articulation is shown by the mounting links 49 which are suitably connected to the frame 12 and also to the mechanism 13 for supporting the latter. In that arrangement, the attachment members 43 are fixedly attached to the mechanism 13, and there is upward pivoting of the guide arms 39 when the mechanism 13 is raised to the position above the ground, whether it is during operation or for transport, and that is achieved by virtue of the pin 42 providing the pivotal connection for the guide arms 39.

In the foregoing description and in view of the drawings, the method of forming the aerating holes is also disclosed and will therefore be understood by anyone skilled in the art.

The pivotal links or connectors 39 thus control the movement of the crank arms 28 and 29 in the fore-and-aft direction as well as the direction perpendicular or lateral thereto, and thus the tine assembly 31 is controlled and stabilized. Accordingly, the pivot pins 41 and 42 each have opposite extending ends 51 and 52 upon which the respective one of the connectors 39 is attached and in contact therewith. With that arrangement, the connectors 39 serve to control the arms 28 and 29 in that fore-and-aft plane as well as stabilizing the arms 28 and 29 in the lateral direction and thus resist the otherwise lateral forces acting on the tine assembly 31 when it penetrates the ground. Of course the spacing between the two arms 39 is such that the arms 39 restrict the lateral motion of the crank arms 28 and 29 in the stabilizing of the assembly 31, as mentioned. That is, the arms 39 are in close proximity to the opposite edges of the crank arms 28 and 29 for the lateral restriction of movement, as mentioned. Also, a bolt 53 connects across the arms 39 for lending further stability and rigidity in the lateral direction for the arms 39 and thus the support for the crank arms 28 and 29 as being mentioned herein. A mounting sleeve 34 extends over each of the pins 32 and 33, and the lower ends of the crank arms 28 and 29 snugly surround the sleeve 34 for additional lateral stability while permitting the aforementioned pivotal action between the arms 28 and 29 and the assembly 31.

Figure 3:
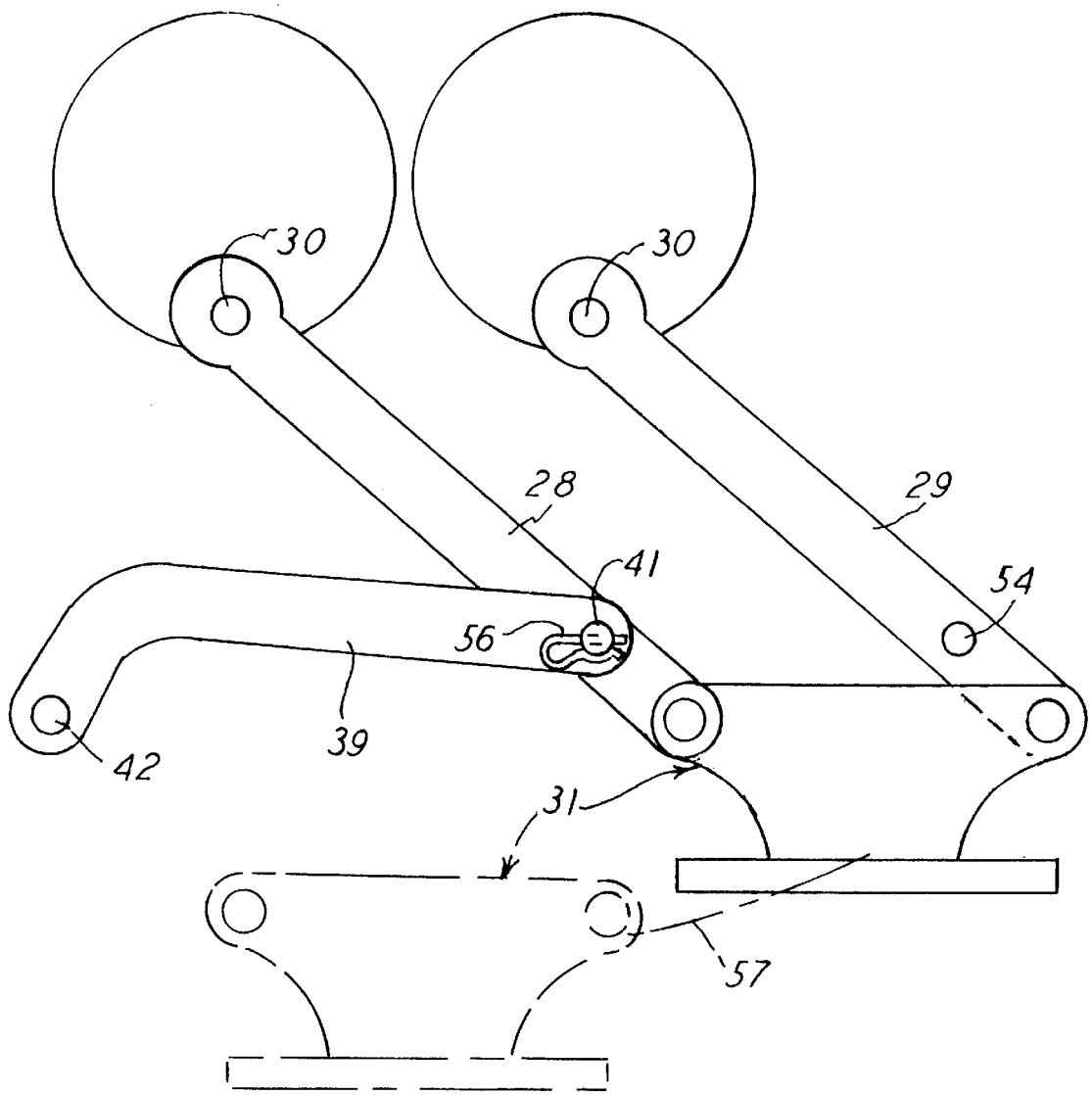
FIG. 3 is a diagrammatic side view of an altered position of this turf aerator.

The parallelogram and crank arrangement is such that the tine assembly 31 can be swung to an elevated position as shown in solid lines in FIG. 3 and that would be moving from the dot-dash line position of FIG. 3. In that elevated position, the assembly 31 can be further elevated from the ground, for servicing or even for transport.

To achieve that elevated position, FIG. 3 shows that the arm 39 is still pivotally supported on the pivot pin 42, but the pin 41 is removed from the crank arm 29 and is connected to the crank arm 28. That is, the lower ends of both arms 28 and 29 have openings 54 through which the pin 41 can selectively extend, either for the operative position of FIG. 2 or for the inoperative elevated position of FIG. 3. A spring type of U-shaped hairpin 56, of a conventional type and assembly, extends through the end of the pin 41 and thus holds the assembly of the arms 39, pin 41 and crank arm 28, in the FIG. 3 position. Of course, the fastener 56 is of a quick release type which does not require any tools for removing and attaching, and thus the elevated position for the assembly 31 can be achieved in the field or the like. Also, the dot-dash line designated 57 shows the general path of movement for the assembly 31 from its lower operative position to its raised elevated position, and this of course is when the crank bolts 30 or the like are in the position shown in FIG. 3.

FIGS. 2 and 3 show that the crank arms 28 and 29 articulate to alter the angle of their longitudinal extent relative to the ground. Thus, while the upper axes A and B revolve about their respective crank fixed axes, the lower ends of the arms 28 and 29, such as at bolts 32 and 33, move in the fore-and-aft directions which are respectively opposite from the simultaneous fore-and-aft movement of the axes A and B. Thus the pin 41, which is articularly connected at a location along the length of the arm 29, is a moving fulcrum for the aforementioned movement the arm 29. The actual movement of the fulcrum is that of the arcuate movement of the pin 41 as established by the pivoting of the link 39 about its axis at pin 42. This is the action inherent in the aerating functioning of the aerator shown.

What is claimed is:

1. In an aerator for use in forming holes in turf and having a ground-mobile structure for movement over the ground in an aerating operational direction, a crank mechanism rotatably mounted on said structure, a power source connected to said crank mechanism for rotating the latter, an assembly of vertical orientation of ground-penetrating tines and a tine support and with said tines being movable into and out of the ground, and a crank arm pivotally connected between said crank mechanism and said assembly for up-and-down and fore-and-aft movements of said assembly in an upright plane extending in the operational direction and upon rotation of said crank mechanism, the improvement comprising:

two sets; each set consisting of said crank mechanism and said crank arm wherein said crank mechanism and said crank arm are both in duplicate in each set and wherein said crank arms are parallel to each other in each set and are spaced apart in said upright plane extending in said operating direction and are connected and disposed relative to both said assembly and said crank mechanism and form a parallelogram with said assembly and said crank mechanism in each set and thereby maintain the vertical orientation of said tines throughout their entire movement into and out of the ground, and a link pivotally connected between said structure and one of said crank arms for limiting the fore-and-aft movement of said crank arms.

2. In an aerator for use in forming holes in turf and having a ground-mobile structure for movement over the ground in an aerating operational direction, a crank mechanism rotatably mounted on said structure, a power source connected to said crank mechanism for rotating the latter, an assembly of vertical orientation of ground-penetrating tines and a tine support and with said tines being capable of penetration and withdrawal relative to the ground, and a crank arm pivotally connected between said crank mechanism and said assembly for up-and-down and fore-and-aft movements of said assembly in an upright plane extending in the operational direction and upon rotation of said crank mechanism for penetration and withdrawal of said tines relative to the ground, the improvement comprising:

said crank mechanism including two separate central rotation axes and two cranks presenting two crank axes offset from said central axes and being spaced apart a distance in the aerating operational direction and providing mounting axes, one said crank arm pivotally attached to each respective one of said cranks at the respective said offset axis of said cranks and with each said arm extending from the respective said offset axis in the upright plane of the aerating operational direction, and said crank arms being pivotally attached to said assembly in spaced apart positions thereon equal to said distance and extending from said axes and being arranged to form a parallelogram with said arms and the distance between said mounting axes thereof, all to maintain the vertical orientation of said tines in the penetration and withdrawal of said tines relative to the ground, and a link pivotally connected between said structure and one of said crank arms for controlling the fore-and-aft movement of said crank arms.

3. The aerator as claimed in claim 2, wherein said two cranks and said two arms are respectively disposed on a common vertical plane extending in a fore-and-aft vertical plane of said direction, and said assembly includes two pivot connectors spaced apart in said operational direction and being arranged for pivot connection to said crank arms.

4. The aerator as claimed in claim 2, wherein said two pivot connectors are spaced apart a distance in said operational direction sufficient to present one side of said parallelogram.

5. The aerator as claimed in claim 4, including two of said cranks and two of said crank arms being arranged to present one set thereof, and there being two additional said cranks and two additional said crank arms arranged to present an additional set, and said two sets being disposed side-by-side relative to each other with both said sets being in respective vertical planes in said operational direction.

6. The aerator as claimed in claim 5, wherein said tine support extends in said operational direction at least for the entire said distance, and said tine support is arranged to present one side of said parallelogram.

7. The aerator as claimed in claim 2, wherein said tine support extends in said operational direction at least for the entire said distance, and said tine support is arranged to present one side of said parallelogram.

8. An aerator for forming holes in turf, comprising a mobile support having a fore-and-aft axis and being movable along said axis for turf aerating in a fore-and-aft direction along said axis, two cranks rotatably mounted on said support and being disposed in tandem on a vertical plane which is parallel to said axis and with said cranks each having a radially offset portion of a common length extending to a location of a respective crank axis thereon and with said portions being arranged for extending in a same radial direction throughout the rotation of said cranks and being arranged to have said crank axes spaced apart a constant distance during the entire crank rotation, a tine support having an extent in said fore-and-aft direction which is at least equal to said constant distance of the spacing between said crank axes and having two locations thereon spaced apart said constant distance of the spacing of said crank axes, a plurality of tines on said tine support for penetrating the turf upon up-and-down movement of said tines, a crank arm pivotally connected to each said crank offset portion at respective ones of said crank axes and being pivotally connected to said tine support at respective ones of said locations, and being arranged to form a parallelogram with said crank axes and said support locations for vertical movement of said tines upon rotation of said cranks, two horizontally disposed pivot pins with one disposed on one of said crank arms and the other one disposed on said mobile support and said pins having opposite ends, and a link having opposite ends which are respectively pivotally mounted on said ends of said pivot pins on said mobile support and on said one of said crank arms for controlling movement of said crank arms in said fore-and-aft direction and in a direction lateral thereto.

9. The aerator as claimed in claim 8, including each of said crank arms has a pin hole extending horizontally therein for alternate and selective reception of the one of said pivot pins disposed on said crank arm, and the arrangement being such to thereby extend said limiting movement of said arm and of said tine support.

10. The aerator as claimed in claim 9, wherein said two cranks are a first set of cranks and there are two additional cranks rotatably disposed adjacent said first set of cranks and forming a second set of cranks, an additional tine support and a plurality of additional tines on said additional support, a crank arm pivotally connected to each of said two additional said cranks and to said additional support, and said two sets of said cranks being arranged to be out of phase of rotation with respect to each other and thereby being arranged to penetrate the turf at times which are different from each other's turf penetration times.

11. The aerator as claimed in claim 10, including two links pivotally attached to said mobile support and respectively pivotally attached to one of said crank arms in each of said sets for limiting movement of said crank arms in said fore-and-aft direction.

12. The aerator as claimed in claim 8, wherein said two crank offset portions and said tine support and said crank arms all extend along a vertical plane which is parallel to said fore-and-aft direction and thereby are disposed to present said parallelogram, and said link extends along a vertical plane which is parallel to said fore-and-aft direction.

13. An aerator for forming holes in turf, comprising a mobile support having a fore-and-aft axis and being movable along the ground in a fore-and-aft direction along said axis in aerating of the turf, two cranks rotatably mounted on said support and each of said cranks having a respective offset portion disposed in a common first vertical plane parallel to said fore-and-aft direction, two crank arms with each one thereof respectively pivotally connected to said offset portions and with each of said crank arms having an end respectively extending from said offset portions, an assembly of a tine support and tines and with said assembly being pivotally connected to said extending ends of said crank arms, said two crank arms and said assembly being disposed to extend in a vertical plane parallel to and adjacent said first vertical plane, said two offset portions and said two crank arms and said assembly all being arranged to have the pivot connections thereon present a parallelogram in a view perpendicular to said vertical planes, and a link pivotally connected to said mobile support and pivotally connected to one of said crank arms, and with both the aforesaid pivot connections of said link being on a respective axis which is horizontal, for limiting motion of said crank arm in said fore-and-aft direction.

14. The aerator as claimed in claim 13, wherein said link includes two spaced-apart members disposed on a respective side of a respective one of said crank arms and with said members being arranged with horizontally disposed pivot pins which are snug with said members and said crank arms in an arrangement which is stable, all to avoid movement of said crank arms in a direction which is lateral to said fore-and-aft direction.

15. The aerator as claimed in claim 13, wherein said link is releasably connected to said one of said crank arms by means of a self-preserved restorable connection, the other one of said crank arms and said connection are arranged to releasably interconnect said link to said other one of said crank arms in a manner to position said assembly beyond said limiting motion, to thereby position said assembly in an extended position.

16. The aerator as claimed in claim 13, wherein said pivot connection of said link and a first one of said crank arms is a quick-release connection of a pin hole on said first one of said crank arms and a pin in said pin hole and on said link, and a second one of said crank arms having a pin hole for receiving said pin after said pin is released from said first one of said crank arms, and thereby being arranged to pivotally interconnect said link and said second one of said crank arms in a manner to position said assembly beyond said limiting motion, to thereby position said assembly in an extended position for servicing said tines.

17. In an aerator for use in forming holes in turf and having a ground-mobile structure for movement over the ground in an aerating operational direction, a crank mechanism rotatably mounted on said structure, a power source connected to said crank mechanism for rotating the latter, an assembly of vertical orientation of ground-penetrating tines and a tine support and with said tines being movable into and out of the ground, and a crank arm pivotally connected between said crank mechanism and said assembly for up-and-down and fore-and-aft movements of said assembly in an upright plane extending in the operational direction and upon rotation of said crank mechanism, the improvement comprising:

two sets; each set consisting of said crank mechanism and said crank arm wherein said crank mechanism and said crank arm are both in duplicate in each set and wherein said crank arms are parallel to each other in each set and are spaced apart in said upright plane extending in said operating direction and are connected and disposed relative to both said assembly and said crank mechanism and form a parallelogram shaped assemblage along with said assembly and said crank mechanism in each set and thereby maintain the vertical orientation of said tines throughout their entire movement into and out of the ground, and a member engageable with said assemblage for limiting the fore-and-aft movements of said assembly in the upright plane.

18. In an aerator for use in forming holes in turf and having a ground-mobile structure for movement over the ground in an aerating operational direction, a crank mechanism rotatably mounted on said structure, a power source connected to said crank mechanism for rotating the latter, an assembly of ground-penetrating tines and a tine support, and a crank arm pivotally connected between said crank mechanism and said assembly for up-and-down and fore-and-aft movements of said assembly in an upright plane extending in the operational direction and upon rotation of said crank mechanism, the improvement comprising:

said crank mechanism including two separate central rotation axes and two cranks presenting two crank axes offset from said central axes and being spaced apart a distance in the aerating operational direction and providing mounting axes, one said crank arm pivotally attached to each respective one of said cranks at the respective said offset axis and extending from the respective said offset axis in the upright plane of the aerating operational direction, and said crank arms being pivotally attached to said assembly in spaced apart positions thereon equal to said distance and being arranged to form a parallelogram with said arms and the distance between said mounting axes thereof, all to maintain the vertical orientation of said tines in the penetration and withdrawal of said tines relative to the ground, and a member connected with said assembly and being arranged for controlling the fore-and-aft movement of said assembly in said direction and when said tines are withdrawn from the ground.

19. In a process of forming aerating holes in turf, the steps of supporting a turf-penetrating tine on a ground-mobile support operative in a direction along a vertical plane for turf aerating and having said tine disposed in a vertical orientation, and vertically moving said tine into and out of the turf to achieve the aerating function, moving said mobile support over the turf at a speed synchronized with tine up and down movement, the improvement comprising the steps of mounting two cranks on said ground-mobile support and in said vertical plane and being disposed spaced apart on said plane and in said aerating direction, and rotating said cranks in unison, supporting a plurality of tines in a vertical orientation and on a horizontally disposed tine support which extends in said aerating direction and intersects said vertical plane, and with said tine support extending in said direction for the distance of the spacing of said cranks, pivotally connecting said cranks and said tine support together by means of crank arms and providing two pivotal connections between said tine support and said crank arms at two respective locations spaced apart on said tine support a distance equal to said spacing of said cranks, with all being arranged to form a parallelogram for actuating said tines only in the vertical orientation, and moving said tines forwardly relative to said direction and when said tines are out of the turf.

20. A turf aerator having movable tines and tine mountings for constantly supporting the tines only in a vertical orientation for aeration of turf, comprising a mobile frame for moving in a fore-and-aft direction of aerating turf, two cranks rotatably supported by said frame at a respective rotation axis and presenting two axes extending horizontally and perpendicularly to said direction and at a first common elevation and with said axes being spaced apart, a crank arm articularly connected to each of said cranks and having a respective lower end extending downwardly from said cranks and with each said arm having an axis and presenting two axes extending horizontally and perpendicularly to said direction at a second common elevation, a tine support having two horizontal axes spaced apart in said direction and at a spacing the same as the spacing of said crank axes and with said support being articularly connected with said support at said support two axes and respectively to said crank arm axes, whereby said cranks and said arms and said support together depict a parallelogram and thereby said support axes are on a horizontal orientation throughout the rotation of said cranks, a plurality of tines mounted on said support and thereby are always are oriented in a vertical direction, and a fulcrum movably supported on said frame and being articularly connected to said crank arm at a location on said crank arm intermediate said first and said second elevation, for controlling movement of said tines.

21. The turf aerator as claimed in claim 20, wherein said fulcrum consists of a lever pivotally mounted on said frame and extends to the articular connection with said crank arm and thereby induces movement, in said fore-and-aft direction, of each said crank arm lower end opposite from the movement of each said crank arm at the connection with said cranks.

22. An aerator for forming holes in turf, comprising a mobile support having a fore-and-aft axis and being movable along said axis for turf aerating in a fore-and-aft direction along said axis, two cranks rotatably mounted on said support and being disposed in tandem on a vertical plane which is parallel to said axis and with said cranks each having a radially offset portion of a common length extending to a location of a respective crank axis thereon and with said portions being arranged for extending in a same radial direction throughout the rotation of said cranks and being arranged to have said crank axes spaced apart a constant distance during the entire crank rotation, a tine support having an extent in said fore-and-aft direction which is at least equal to said constant distance of the spacing between said crank axes and having two locations thereon spaced apart said constant distance of the spacing of said crank axes, a plurality of tines on said tine support for penetrating the turf upon up-and-down movement of said tines, a crank arm pivotally connected to each said crank offset portion at respective ones of said crank axes and being pivotally connected to said tine support at respective ones of said locations, and being arranged to form a parallelogram with said crank axes and said support locations for vertical movement of said tines upon rotation of said cranks, and a member mounted on said mobile support and being movable thereon and being in connection with said crank arm in a location between said crank offset portion and said tine support, for inducing opposite direction of movement of said crank arm at said tine support compared to the direction of movement of said crank arm at said crank offset portion.

23. An aerator for forming holes in turf, comprising a mobile support having a fore-and-aft axis and being movable along the ground in a fore-and-aft direction along said axis in aerating the turf, two cranks rotatably mounted on said support and each of said cranks having a respective offset portion disposed in a common first vertical plane parallel to said fore-and-aft direction, two crank arms with each one thereof respectively pivotally connected to said offset portions and with each of said crank arms having an end respectively extending from said offset portions, an assembly of a tine support and tines and with said assembly being pivotally connected to said extending ends of said crank arms, said two crank arms and said assembly being disposed to extend in a vertical plane parallel to and adjacent said first vertical plane, said two offset portions and said two crank arms and said assembly all being arranged to have the pivot connections thereon present a parallelogram in a view perpendicular to said vertical planes, and a fulcrum movably supported on said mobile support and being articularly connected to one of said crank arms at a location on said one crank arm between said offset portions and said tine support, for controlling movement of said assembly.

* * * * *